(No Model.)

F. E. GA NUN.
BICYCLE LOCK.

No. 583,174. Patented May 25, 1897.

WITNESSES:
John Buckler,
C. Gerst.

INVENTOR
Frank E. Ga Nun,
BY Edgar Tate & Co
ATTORNEYS.

UNITED STATES PATENT OFFICE.

FRANK E. GA NUN, OF NEW YORK, N. Y.

BICYCLE-LOCK.

SPECIFICATION forming part of Letters Patent No. 583,174, dated May 25, 1897.

Application filed January 27, 1896. Serial No. 576,917. (No model.)

*To all whom it may concern:*

Be it known that I, FRANK E. GA NUN, a citizen of the United States, and a resident of New York, in the county of New York and State of New York, have invented certain new and useful Improvements in Bicycle-Locks, of which the following is a specification, reference being had to the accompanying drawings, forming a part thereof, in which similar letters of reference indicate corresponding parts.

This invention relates to bicycle-locks, and the object thereof is to provide a lock for vehicles of this class which may be connected with one of the forks thereof and which is provided with projecting arms or other devices, which operate in connection with the wheel, so as to prevent the revolution of the wheel; and with this and other objects in view the invention consists in the construction, combination, and arrangement of parts hereinafter described and claimed.

The invention is fully disclosed in the following specification, of which the accompanying drawings form a part, in which—

Figure 1 is a side view of a portion of a bicycle-wheel, showing also the fork in which the wheel is mounted and my improved lock, which is connected with the fork; Fig. 2, a section of the casing of the lock on the line 2 2 of Fig. 3; Fig. 3, a section on the line 3 3 of Fig. 2, and Fig. 4 an end view thereof.

In the drawings forming part of this application, A represents the tire of a bicycle or similar vehicle; $a$, the rim of the wheel to which the tire is secured; $a^2$, the spokes of the wheel, and $a^3$ the hub thereof, to which the fork B is secured; and in the practice of my invention I provide a lock comprising a casing C, which is secured to the fork B of the wheel, as shown in Fig. 1, and in which is placed or in which is formed a cross bar or brace D, which is provided in its lower side with a transverse slot or passage $d$, in which is placed a spring-operated locking-bolt E, the body portion of which is angular in cross-section and the rear end of which is provided with a cylindrical extension F, on which is mounted a spiral spring G, and the cylindrical extension F passes through a cross-plate or other support $g$.

The forward end of the locking-bolt E is beveled or inclined, as shown at F, and pivotally connected with the sides of the casing at H and forward of the cross bar or brace D are spring-arms $h$ and $h^2$, which project through slots K, formed in the end of the casing C, adjacent to the sides thereof, and the slots K are continued downwardly and extend backwardly in the outer side of the casing, as shown at $k$, and the inner ends of the spring-arms $h$ and $h^2$ are united by a cross rod or bar $h^3$.

Formed in the lower side of the locking-bolt E is a cavity or recess L, into which the head of a key is adapted to enter, and the outer side of the casing C is provided with a keyhole M, and the operation will be readily understood from the foregoing description when taken in connection with the accompanying drawings and the following statement thereof:

The spring-arms $h$ and $h^2$ are preferably composed of wire, and when the locking-bolt E is forced inwardly against the operation of the spring G said arms are free to swing in the slots K and $k$, and whenever it is desired to lock the bicycle said spring-arms $h$ and $h^2$ are raised into the position shown in Figs. 1 and 2, in which position they are held by the locking-bolt E, said bolt being moved backwardly by means of a key to admit of the raising of the arms, and when in this position it will be apparent that the wheel cannot be revolved, and when it is necessary to unlock the device, so as to permit of the operation of the vehicle, the key is again inserted and the bolt E is forced backwardly, thus removing the support for the arms, whereupon they at once drop.

It will thus be seen that I provide a simple and effective lock for bicycles or other vehicles of this class, and one which is comparatively inexpensive and which may be quickly and easily connected with or secured to one of the forks of said vehicles; and, Having fully described my invention, I claim as new and desire to secure by Letters Patent—

1. A lock for bicycles and similar vehicles, comprising a casing which is adapted to be secured to the fork thereof, spring side arms which are pivotally connected with said casing within one end thereof, and which project through slots formed in the said end and in the end of the adjacent side of the casing, said casing being also provided with a spring-operated bolt, and said arms being connected with the casing by a cross-bar in connection with which said bolt operates, and means for operating said bolt to hold said arms in the desired position, substantially as shown and described.

2. The combination with the fork of a bicycle or similar vehicle, of a lock comprising a casing which is connected therewith, said casing being provided with projecting arms which are pivotally connected therewith, within one end thereof, and which project through slots formed in the adjacent end of the casing, and which communicate with slots formed in the outer side of the casing, said arms being connected by means of a cross rod or bar within the casing, and said casing being also provided with a spring-operated locking-bolt which operates in connection with said cross bar or rod to hold said arms in the desired position, and said arms being adapted to operate in connection with the spokes of the adjacent wheel, substantially as shown and described.

In testimony that I claim the foregoing as my invention I have signed my name, in presence of the subscribing witnesses, this 25th day of January, 1896.

FRANK E. GA NUN.

Witnesses:
C. GERST,
J. SAUER.